July 21, 1970 H. BERMAN 3,521,358
DENTAL DRILL ASSEMBLY
Filed Oct. 20, 1967 2 Sheets-Sheet 1

INVENTOR.
HERBERT BERMAN
BY
Wolf, Greenfield & Hicken
ATTORNEYS

July 21, 1970          H. BERMAN          3,521,358
DENTAL DRILL ASSEMBLY
Filed Oct. 20, 1967          2 Sheets-Sheet 2
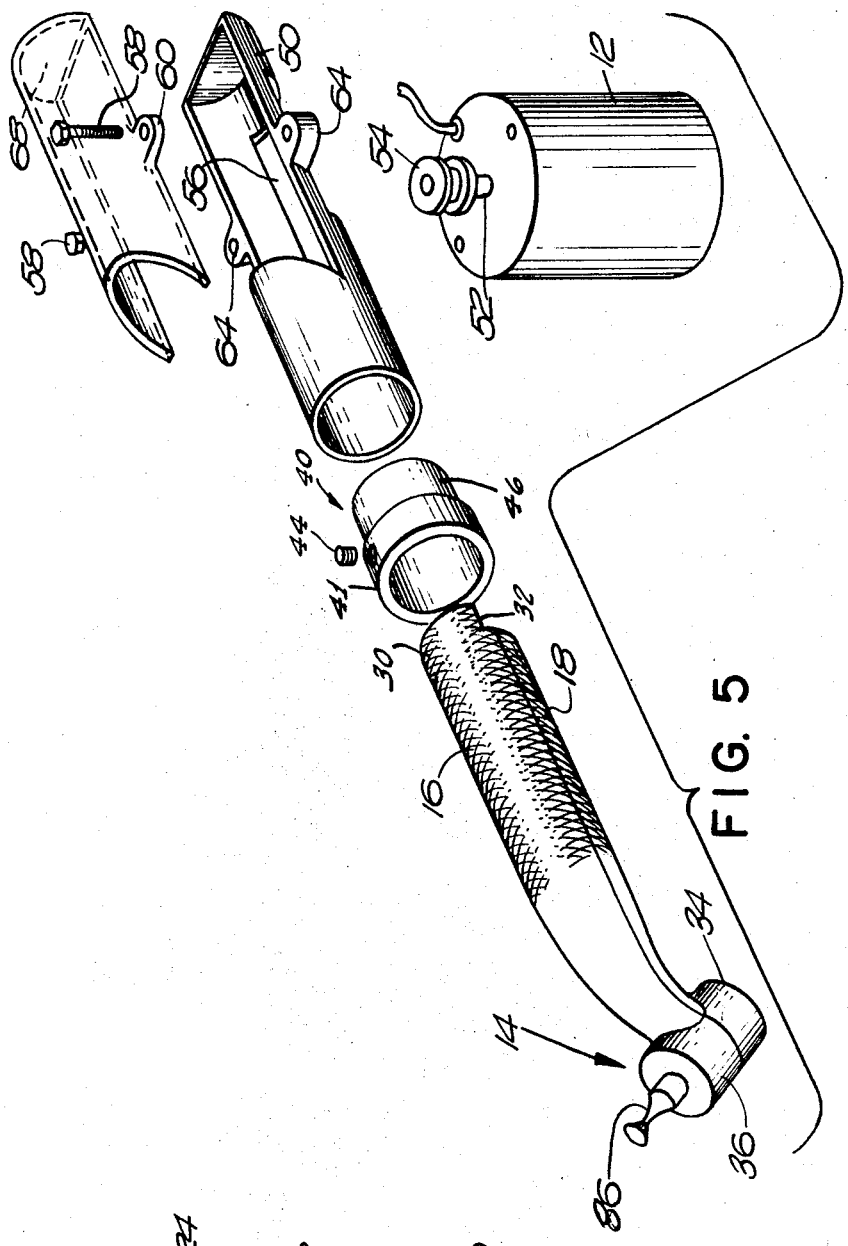
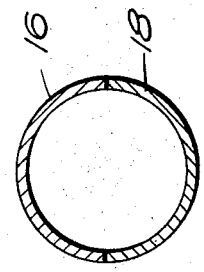
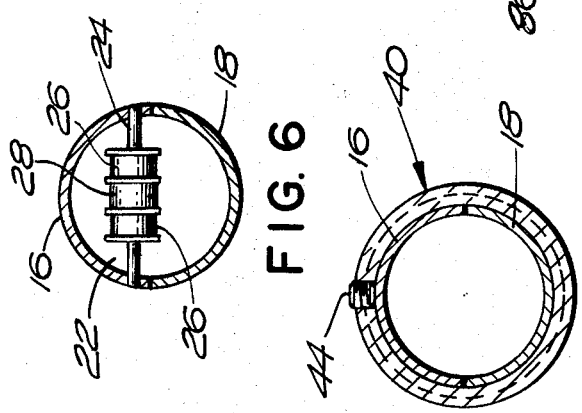
INVENTOR.
HERBERT BERMAN
BY Wolf, Greenfield & Hieken
ATTORNEYS United States Patent Office 3,521,358
Patented July 21, 1970

3,521,358
DENTAL DRILL ASSEMBLY
Herbert Berman, 6 Conant Road,
Weston, Mass. 02193
Filed Oct. 20, 1967, Ser. No. 676,783
Int. Cl. A61c 1/10
U.S. Cl. 32—27                                                11 Claims

ABSTRACT OF THE DISCLOSURE

A dental handpiece having a contra-angle handle with a head at one end and an electric motor at the other, with the motor being rotatably mounted on the handle so that its axis may lie in the plane defined by the handle and head axes or be displaced therefrom up to approximately 90°.

---

This invention relates to dental handpieces and more particularly comprises a new and improved dental handpiece assembly which is powered by a small electric motor carried on the handle.

One important object of this invention is to provide a dental handpiece assembly which is very easy to assemble and disassemble to quickly change the head bearings and belt.

Another important object of this invention is to provide a dental handpiece assembly that includes a motor and which allows the position of the motor to be changed to accommodate the personal preference of the doctor when in use.

Yet another important object of this invention is to provide a motor driven dental drill assembly which is properly balanced with the motor housing at one end and the bur and associated support at the other.

To accomplish these and other objects, the dental handpiece assembly of this invention includes among its many features a handle assembly composed of five major parts; namely, a top angle section and a bottom angle section, a locking ring, motor support section, and a cap. The motor support section is rotatable on the ring and the two angle sections, which allows the motor to be disposed in various positions with respect to the head carried at the front end of the angle. A pulley driven by the motor is aligned with an idler pulley carried by the top angle section so that rotation of the motor support on the angles does not foul the pulley belt.

These and other objects and features of this invention will be better understood and appreciated from the following detailed description of one embodiment thereof, selected for purposes of illustration and shown in the accompanying drawing, in which:

FIG. 5 is an exploded view showing the various parts of the assembly;

FIGS. 6-8 are cross sectional views taken along the section lines 6—6, 7—7 and 8—8 of FIG. 2.

Figure 1:
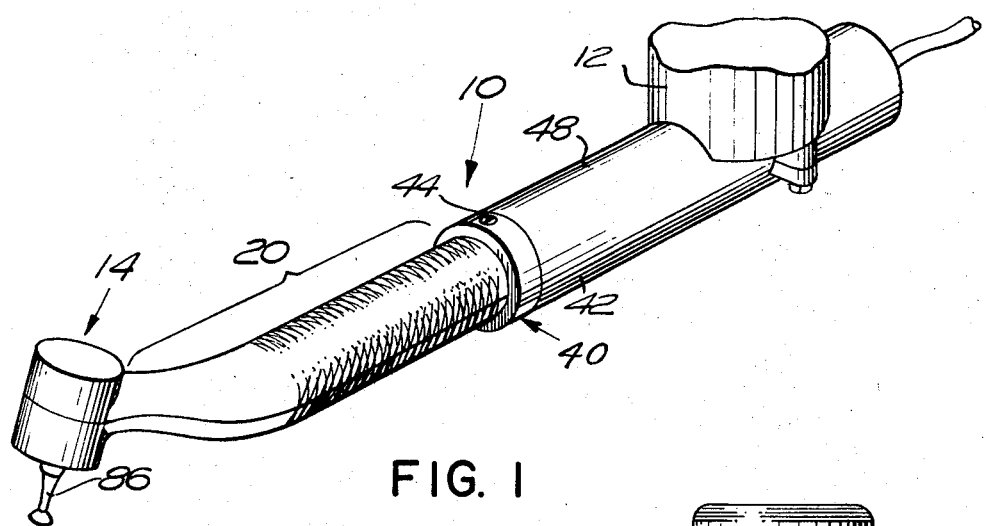
FIG. 1 is a perspective view of a dental handpiece assembly constructed in accordance with this invention.
Figure 2:
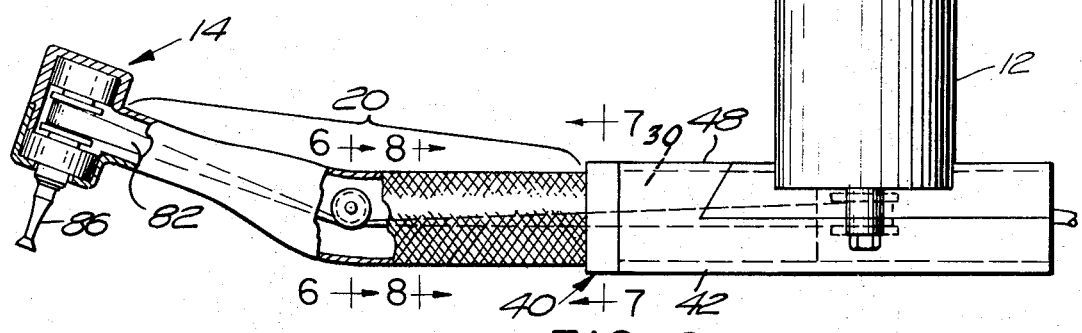
FIG. 2 is a side view partly in section of the assembly shown in FIG. 1.

The dental handpiece assembly shown in FIGS. 1 and 2 includes in its general organization a handle 10, a motor housing 12 and a drill head 14. This invention is particularly concerned with the handle 10, its components, and the adjustments the components provide for the position of the motor with respect to the drill head 14. In this description, the drill head end of the assembly will from time to time be referred to as the front of the assembly while the other end of the handle adjacent the motor housing 12 will be referred to as the rear end of the assembly.

The front end of the handle 10 includes two sections, each semi-circular in cross section, and each bent at its mid-portion to form the contra-angle of the handle. One of these sections, the top angle section, is identified by numeral 16 while the bottom section is identified by numeral 18. The two sections 16 and 18 are adapted to be assembled together to form a bent sleeve or tube which defines the front handle portion 20 designated by the bracket in FIGS. 1 and 2. The rear portion of each section 16 and 18 is shown to be knurled on its outer surface to facilitate handling of the tool by the dentist. Ordinarily the fingers support the tool at the knurled portion.

A pair of aligned holes 22 are provided in the top angle setcion 16 of the handle portion 20, and the holes support a shaft 24 which in turn supports a pair of idler pulleys 26 separated by a spacer 28. The tangents to the bottoms of the two idler pulleys are aligned with the center line of the handle portion 20 as defined by the seam between the sections 16 nd 18, and the belt which is described below makes a turn at the angle at the center line of the assembly.

Figure 3:
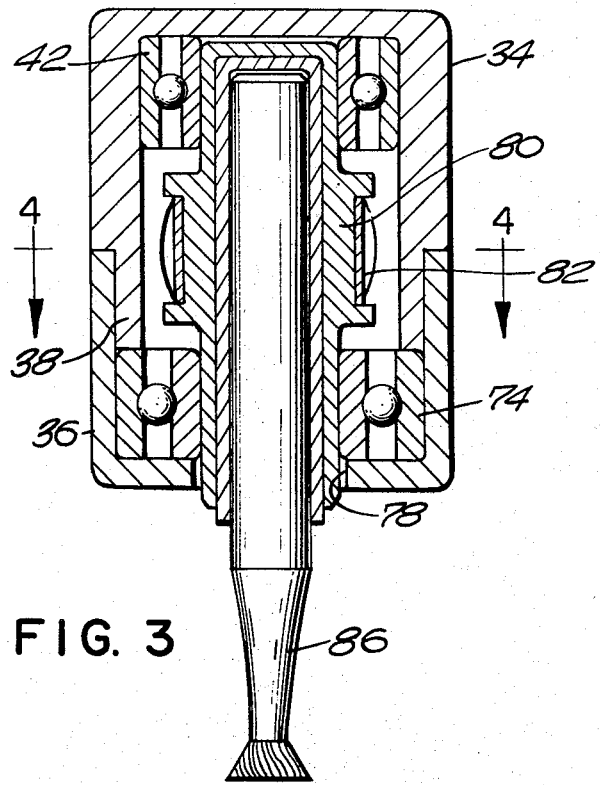
FIG. 3 is an enlarged cross sectional view of the head end of the assembly.
Figure 4:
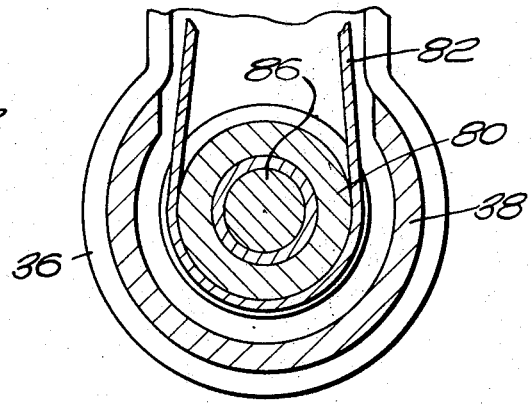
FIG. 4 is a cross sectional view taken along the section line 4—4 of FIG. 3.

A tongue 30 is formed at the rear edge of the handle section 16, and the opposite side edges 32 of the tongue 30 define stops for the motor when it rotates with respect to the handle axis. The forward end of the angle section 18 carries the upper part 34 of the head casing, which may be permanently soldered to or be formed as an integral part of the section 18. Typically, the various parts of the handle may be cast, in which case the head part 34 of the drill assembly could be formed as an integral part of the section 18. The lower part 36 of the drill head is similarly secured to the forward end of the angle section 16, and as best shown in FIG. 3, the upper part 34 has a downwardly extending skirt 38 which fits within the part 36 when the two angle sections 16 and 18 of the handle portion 20 are assembled. The skirt 38 maintains the parts 34 and 36 in aligned orientation and effectively holds the front end of the handle together.

The rear end of the sections 16 and 18 are held together by ring 40 which is shown in FIG. 2 positioned forward of the tongue 30. The ring 40 which slips over the rear parts of the two angle sections 16 and 18 is held in place by a set screw 44. The set screw 44 passes through the thicker portion 41 of the ring 40 while the flange 46 of the ring is disposed inside the motor support section 42 of the handle. The support section 42 of the handle has a cylindrical forward end 48 which receives the flange 46 of the ring 40 and a semi-cylindrical rear portion 50 which is clearly shown in FIG. 5. The rear portion 50 has a slot in the bottom through which shaft 52 of the motor extends to support the drive pulley 54 inside the handle. The motor housing 12 is held in fixed position on motor support 42 such that shaft 52 is perpendicular to the axis of the support. The midline of drive pulley 54 is positioned on shaft 52 so that it is aligned with the center line of the support 42.

While in the embodiment shown, the motor housing 12 is a separate part secured to the handle section 42 by means of screws 58 which extend through the ears 60 on the cap 62 and the ears 64 on the handle section 42, it is to be understood that the motor housing 12 may be cast integrally with the handle section 42. The cap 62 as well as the handle section 42 each carry a generally semi-circular disc at the rear end identified by numerals 68 and 70 respectively, which together define a rear cover for the handle assembly. A hole may be provided in the rear wall defined by the semi-circular discs 68 and 70 to allow the various leads to enter the handle. Alternatively, a terminal block may be disposed in the handle beside the motor through which the various connections may be made. These details do not form part of this invention.

It is evident in FIG. 2 that the tongue 30 which forms part of the angle section 16 defines a pair of stops which limit the rotation of the motor and its support section 42 with respect to the section 20 of the handle. That is, in the absence of the stops 32 defined by the tongue 30, the section 42 and the motor housing 12 could be rotated on the flange of the ring so that the housing 12 could assume any radial position with respect to the section 20. The stops 32 however, limit the rotation of the motor to approximately 90° in each direction from the central position in which it is shown in FIGS. 1 and 2.

In FIGS. 3 and 5 various parts of the head or drill assembly 14 are shown disposed in the parts 34 and 36 of the head. An upper bearing 72 is shown disposed in the part 34, and a somewhat larger bearing assembly 74 is shown disposed in the lower part 36 of the head. The two bearings support a sleeve 76 which extends axially through the head 14 and out the opening 78 formed in the bottom wall of part 36 of the head. The sleeve 76 is integrally formed or permanently secured to the driven pulley 80 about which belt 82 travels. Disposed inside the sleeve 76 is the chuck 84 which in turn receives the bur 86. The chuck may take any one of a number of forms, and the details of the chuck as well as the details of the chuck support within the head form no part of the present invention.

From the foregoing description it will be appreciated that the motor support section 42 with the motor housing 12 may be rotated approximately 90° in either direction with respect to the handle axis. Thus, when the dentist is using the handpiece he may turn the section 42 so as to provide the most comfortable balance for the tool in his hand. Typically, when the dentist is drilling on the lower teeth with the bur and head 14 facing downwardly, the motor housing 12 may be oriented with its axis substantially horizontal and extending either over the thumb or the hand of the dentist. It will also be apparent from the foregoing description that the belt 82 which extends from the motor pulley and about the idler pulley to the driven pulley retains the assembly together. Without the belt, the support section, cap and motor housing may be slipped off the ring flange. The belt tension may be adjusted merely by moving the ring 40 rearwardly or forwardly on the handle section 20 so as to move the section 42 either toward or away from the front of the assembly. This movement obviously will vary the tension of the belt upon the drive and driven pulleys. Further, it will be appreciated that the drill assembly may be disassembled readily by removing the cap 62 and slipping the belt off the motor drive pulley 54. With the belt removed, the section 42 can be slipped off the ring flange 46 and the set screws 44 may be loosened so as to free the ring and allow separation of the two angle portions 16 and 18. So separated, the bearing assemblies, chuck, sleeve, etc. may be removed from the head.

From the foregoing description it will be appreciated that the several objects set forth in the introduction of this application are accomplished by this invention. Air and water tubes may be fastened along one side of the handle, and additional leads may run along the side of the handle adjacent the tubes to provide power for a light (not shown) or other device disposed adjacent the head 14.

What is claimed is:
1. A dental handpiece assembly comprising
a generally cylindrical head and a handle carrying the head at one end,
said head and handle being in the form of a hollow shell,
an electric motor carried by the handle adjacent its other end and connected to the head by a belt and pulley assembly extending through the shell,
said shell being split longitudinally into top and bottom sections and with the split intersecting the axis of the head,
and bearings mounted in the head for supporting a bur axially in the head with one set of bearings lying in each section.

2. A dental handpiece assembly as described in claim 1 further characterized by
said handle being a contra-angle and with the split being in a plane generally perpendicular to the plane defined by the contra-angle.

3. A dental handpiece assembly as described in claim 2 further characterized by
said motor being disposed with its axis perpendicular to the handle axis at the location where the motor is mounted.

4. A dental handpiece assembly as defined in claim 3 further characterized by
guide means forming part of the belt and pulley assembly mounted in the handle at the contra-angle and held in place in one part of the shell.

5. A dental handpiece assembly as defined in claim 1 further characterized by
said handle being a contra-angle with the head axis fixed with respect to the angle,
and support means supporting the motor on the handle permitting the motor to pivot about the handle axis while maintaining the connection between the motor and the head.

6. A dental handpiece assembly comprising,
a head for supporting a bur and a handle carrying the head at one end,
said handle being a contra-angle with the head adapted to support the bur with its axis fixed with respect to the contra-angle,
an electric motor carried by the handle adjacent its other end and connected to the head by a belt and pulley assembly extending through the handle,
and support means supporting the motor on the handle permitting the motor to pivot about the handle axis while maintaining the operative connection between the motor and the head.

7. A dental handpiece assembly as described in claim 6 further characterized by
said handle and head being split longitudinally into two sections with the plane of the split being generally perpendicular to the bur axis,
means retaining the two sections together,
and a motor support section rotatably mounted on the two sections and forming said support means.

8. A dental handpiece assembly as described in claim 7 further characterized by
said motor support section including a cylindrical portion rotatable in the rear portion of the two sections,
a removable cap mounted on the support section adjacent the motor and when removed exposing the interior of the handle.

9. A dental handpiece assembly as described in claim 8 further characterized by
said motor being carried by the support section generally perpendicular to the handle axis,
a drive pulley driven by the motor and disposed inside the handle,
guide means mounted at the contra-angle in the handle and carried in one of the sections,
a driven pulley in the head and supported at one end in the same section as the guide means,
and a belt connecting the drive and driven pulleys and running over the guide means.

10. A dental handpiece assembly as described in claim 9 further characterized by
a ring releasably secured to the two sections and holding them together,
and a flange forming part of the ring and lying within the motor support section.

11. A dental handpiece assembly as described in claim 9 further characterized by
a stop disposed in the handle and limiting motor rotation to approximately 180° on the handle.

References Cited

UNITED STATES PATENTS

| | | | |
|---|---|---|---|
| 1,653,212 | 12/1927 | Johnson et al. | 32—27 |
| 1,688,136 | 10/1928 | Chayes et al. | 32—27 |
| 2,894,325 | 7/1959 | Flatland | 32—27 |
| 3,098,299 | 7/1963 | Page | 32—27 |

ROBERT PESHOCK, Primary Examiner